United States Patent [19]

Ogawa

[11] Patent Number: 5,041,857
[45] Date of Patent: Aug. 20, 1991

[54] AUTOMATIC FLASH MECHANISM FOR CAMERA

[75] Inventor: Yukio Ogawa, Yokohama, Japan

[73] Assignee: Canon Kabushiki Kaisha, Tokyo, Japan

[21] Appl. No.: 423,705

[22] Filed: Oct. 16, 1989

Related U.S. Application Data

[63] Continuation of Ser. No. 289,494, Dec. 20, 1988, abandoned, which is a continuation of Ser. No. 157,120, Feb. 10, 1988, abandoned, which is a continuation of Ser. No. 94,084, Aug. 31, 1987, abandoned, which is a continuation of Ser. No. 936,979, Dec. 1, 1986, abandoned, which is a continuation of Ser. No. 839,467, Mar. 12, 1986, abandoned, which is a continuation of Ser. No. 561,553, Dec. 14, 1983, abandoned.

[30] Foreign Application Priority Data

Dec. 17, 1982 [JP] Japan .................. 57-221632

[51] Int. Cl.$^5$ ........................... G03B 7/16; G03B 9/02
[52] U.S. Cl. ..................................... 354/195; 354/270
[58] Field of Search ............... 354/129, 145.1, 195.11, 354/195.12, 270, 271.1, 272, 411, 420, 421, 422, 423, 442, 444, 445, 455

[56] References Cited

U.S. PATENT DOCUMENTS

| | | |
|---|---|---|
| 3,463,066 | 8/1969 | Engelsmann et al. ............. 354/423 |
| 3,836,922 | 9/1974 | Hasegawa et al. ............ 354/421 X |
| 3,950,765 | 4/1976 | Nanba et al. ...................... 354/444 |
| 4,391,488 | 7/1983 | Ishizaka et al. ................... 354/455 |

FOREIGN PATENT DOCUMENTS

| | | |
|---|---|---|
| 47-7006 | 3/1972 | Japan . |
| 52-101027 | 8/1977 | Japan . |
| 54-99430 | 8/1979 | Japan . |
| 54-162544 | 12/1979 | Japan . |

Primary Examiner—Michael L. Gellner
Attorney, Agent, or Firm—Toren, McGeady & Associates

[57] ABSTRACT

An automatic flash mechanism for a camera with a focal length varying device including a mechanism for transmitting information on object distance, film sensitivity and the focal length of the optical system and is arranged to provide an aperture condition which is apposite to flash photography.

41 Claims, 3 Drawing Sheets

AUTOMATIC FLASH MECHANISM FOR CAMERA

This is a continuation application of Ser. No. 07/289,494, filed Dec. 20, 1988, which in a continuation of Ser. No. 07/157,120, filed Feb. 10, 1988, which is a continuation application of Ser. No. 07/094,084, filed Aug. 31, 1987, which is a continuation application of Ser. No. 06/936,979, filed Dec. 1, 1986, which is a continuation application of Ser. No. 06/839,467, filed Mar. 12, 1986, which is a continuation application of Ser. No. 06/561,553, filed Dec. 14, 1983, all abandoned.

BACKGROUND OF THE INVENTION

1. Field of the Invention

This invention relates to an automatic flash mechanism (hereinafter called the FA mechanism) for a camera having a focal length varying device arranged to permit selection of one of at least two different focal lengths by shifting an optical system.

2. Description of the Prior Art

Figure 1A:
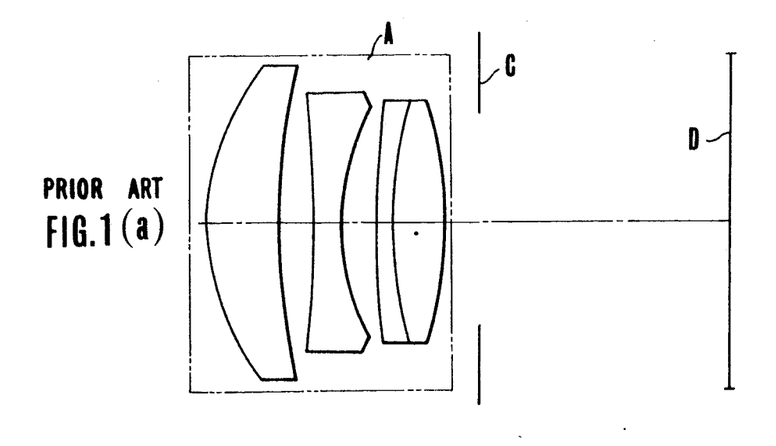
FIGS. 1(a) and 1(b) are each a schematic illustration showing by way of example an optical system of a variable focal length camera.
Figure 1B:
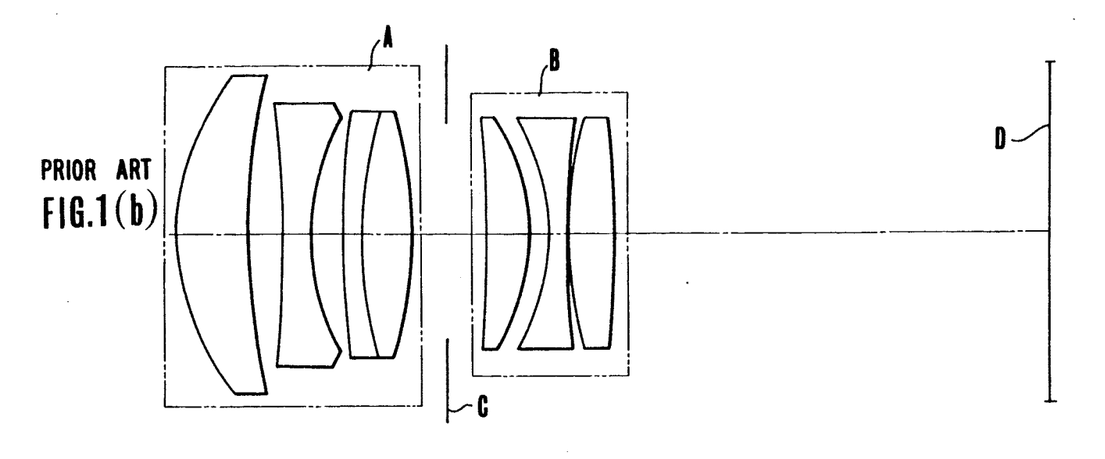

FIG. 1 of the accompanying drawings shows by way of example the optical system of a camera having a focal length varying device. The photographic optical system of the camera consists of a main lens system A and an auxiliary lens system B which is arranged to be movable to and away from the optical axis of the main lens system A. Normal photography is performed solely with the main lens system A by retracting the auxiliary lens system B out of the path of the optical axis as shown in FIG. 1(a). The camera permits tele-photography. In that event, the main lens system A is moved forward while the auxiliary lens system B is positioned behind the former on the optical axis to perform photography with the whole optical system as shown in FIG. 1(b). In FIG. 1, reference symbols C and D respectively denote a stop and a film surface. Various kinds of variable focal length cameras have been known, for example, from U.S. Pat. No. 3,388,650, Japanese Laid-Open Patent Applications No. SHO 52-76919 and 54-33027, etc. These cameras of the prior art include many cameras that are arranged to use a stop device in common for the optical system before focal length change-over and the optical system after the change-over as represented by the stop C of FIG. 1. In the camera of this type, however, the F-number of the optical system changes due to change-over between one focal length to another after shifting of the optical system. Therefore, in case of flash photography, the aperture of the stop must be varied, for the same object distance, according to the focal length change-over. This requires provision of some adjustment mechanism for varying the aperture. In many cases, however, such adjustment mechanism is omitted to avoid complication of structural arrangement. Such cameras are incapable of performing an accurate exposure and thus have to rely upon the latitude of the film.

To solve this problem, it has been proposed to incorporate the guide number of the flash device in the camera variable in association with the focal length change-over of the optical system. This method is carried out by effecting a change in flash light emission quantity by changing the charge capacity of the flashing capacitor or by arranging a light reducing plate in front of the flash device. The method, therefore, requires some additional space within the camera for arranging a plurality of capacitors there or it wastes the flash light quantity.

SUMMARY OF THE INVENTION

An object of the present invention is to provide an FA mechanism which, despite having an extremely simple structural arrangement, is capable of adjusting the aperture of a stop in response to a focal length change-over action of a focal length varying device to ensure that automatic flash photography is always carried out with an opposite exposure according to the object distance and the film sensitivity even when the F-number of the stop is varied by a shift of focal length of the optical system.

The above and further objects and features of the invention will become apparent from the following detailed description of the preferred embodiments thereof taken in conjunction with the accompanying drawings.

DETAILED DESCRIPTION OF THE PREFERRED EMBODIMENTS

Figure 2:
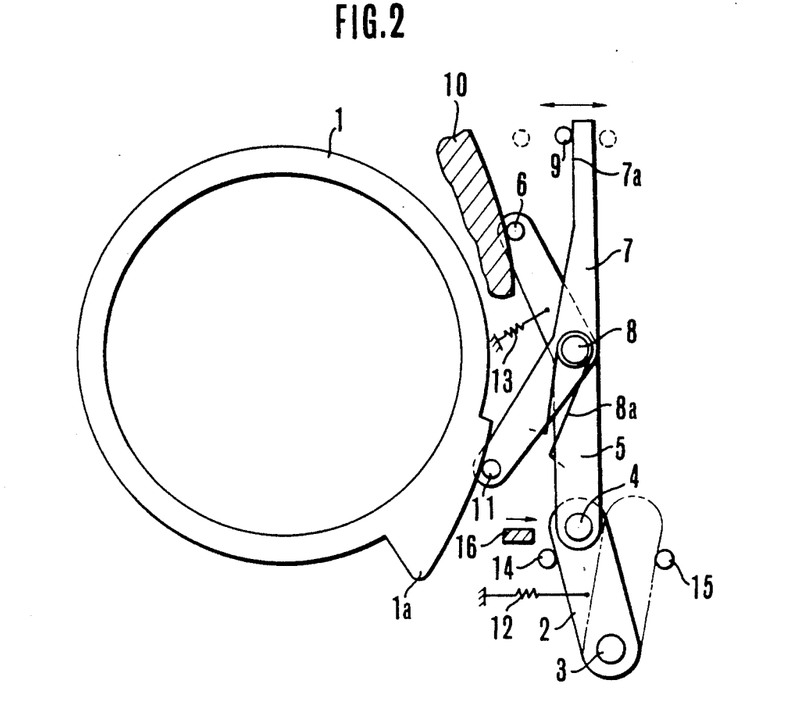
FIGS. 2 and 3 are partly simplified plan views showing an embodiment of the invention before and after focal length change-over of an optical system.
Figure 3:
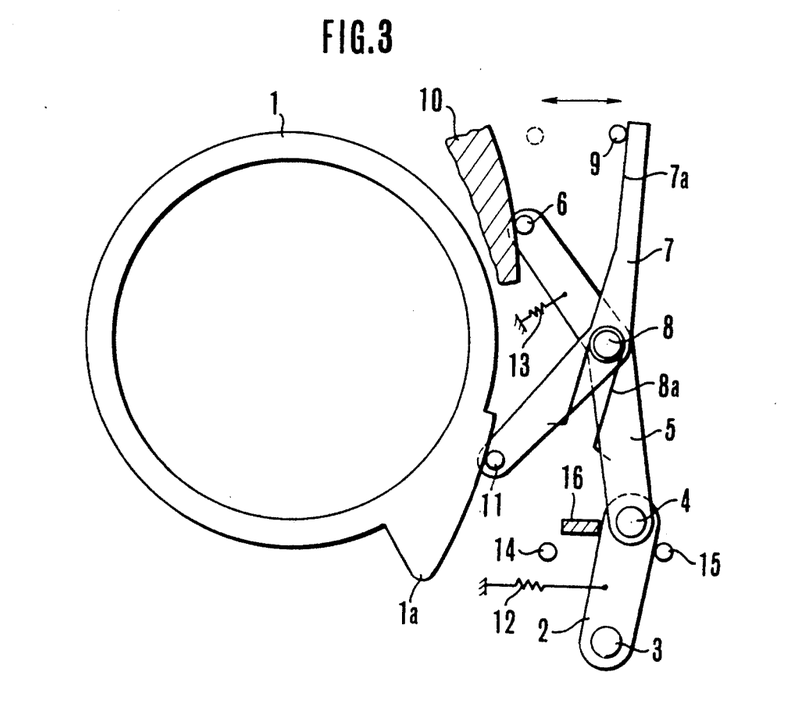

Referring to FIGS. 2 and 3, for the sake of simplification of description, let us assume that FIG. 2 shows a normal photographic state of the embodiment and that FIG. 3 shows a tele-photographic state thereof. The embodiment depicted in the drawings, includes a distance ring 1 and a photographic lens (not shown) which can be set in any desired position between infinity and a near distance photographic position by turning the distance ring 1. A change-over lever 2 which constitutes focal length detecting means for detecting the focal length of the optical system, is pivotally carried by a fixed shaft 3 and is urged to turn counterclockwise thereon by a spring 12. The counterclockwise turning of the lever 2 is limited by a stopper 14. An ISO sensitivity lever 5 is arranged to be responsive to an ISO film sensitivity setting operation. One end of the ISO sensitivity lever 5 is rotatably connected to the change-over lever 2 by a shaft 4. A distance lever 7 is rotatably carried by a shaft 8 provided on the middle part of the ISO sensitivity lever 5. A spring 8a which is connected to the shaft 8 urges the lever 7 to turn clockwise relative to the ISO sensitivity lever 5. The urging force of the spring 8a is smaller than that of the spring 12. The ISO sensitivity lever 5 has an ISO sensitivity pin 6, which constitutes film sensitivity detecting means for detecting a film sensitivity adjusting position, secured to the fore end thereof while a spring 13 urges the ISO sensitivity lever 5 to turn counterclockwise on the shaft 4. This causes the ISO sensitivity pin 6 to abut on an ISO cam 10 which is arranged to be displaced by a change in ISO sensitivity setting. An aperture pin 9 which determines the aperture of a shutter (not shown) is constantly urged to move to the right by a spring (not shown) arranged to be weaker than the spring 13. The aperture is arranged to become larger when the aperture pin 9 moves to the right as viewed on the drawing and smaller when the pin 9 moves to the left. Meanwhile, the rightward displacement of the aperture pin 9 is restricted by the fore end part 7a of the distance lever 7.

The term "the aperture of a shutter" as used above means that, in this case, the shutter is provided with shutter blades which are arranged to serve a combined function as a stop. In this case, the aperture pin 9 is arranged to move in association with the opening and closing movements of the shutter blades. The pin 9 moves to the right as viewed on the drawing when the shutter blades move to open and to the left when they move to close. Upon completion of an exposure action of the shutter, the pin 9 comes back to its initial position which is a left position as viewed on the drawing and in which the pin 9 stays prior to shutter release. However, the present invention is not limited to the use of this type of shutter which serves the combined function as a stop but also applicable to a case where stop blades are arranged separately from the shutter blades. In the latter case, the aperture pin 9 is responsive to the stop blades and the aperture is arranged to increase according as the pin 9 moves to the right. A distance transmission pin 11, which constitutes focal point detecting means for detecting the focused position of the optical system, is secured to one end of the distance lever 7 and is arranged to be relatively shiftable along a distance cam 1a provided on the distance ring 1. A change-over member 16 is arranged to move from the position of FIG. 2 in the direction of the arrow in response to a focal length change-over of the optical system, which is arranged as shown in FIG. 1, from a normal focal length to a longer or telephoto focal length. With the change-over member 16 thus moving, the change-over lever 2 is pushed against the force of the spring 12 to turn clockwise until it comes from the full line position to a chain line position of FIG. 2 where it abuts on a stopper 15 as shown in FIG. 3.

The operation of the FA mechanism of the variable focal length camera which is arranged as described above is as follows: Under the normal condition of the photographic optical system as shown in FIG. 2, the change-over member 16 stays away from the change-over lever 2. The change-over lever 2 remains in a position to abut on the stopper 14 due to the urging force of the spring 12. With the force of the spring 12 arranged to be stronger than that of the spring 13, the ISO sensitivity lever 5 which is turnable on the shaft 4 is kept by the spring 13 in a position to have the ISO sensitivity pin 6 abut on the ISO cam 10. In this instance, let us assume that the ISO cam 10 is kept in a position corresponding to an ISO sensitivity value. Then, if the distance ring 1 is turned to bring it to the position shown in FIG. 2, by a focusing operation of the photographic lens on an object to be photographed, the distance transmission pin 11 comes to assume a corresponding position on the distance cam 1a. Accordingly, the clockwise turn of the distance lever 7 on the shaft 8 is restricted by the abutting position of the distance transmission pin 11 on the distance cam 1a. This determines the position in which the distance lever 7 is to be kept. As a result, the rightward shifting limit position of the aperture pin 9 is also determined. Then, the aperture of the shutter is set at a value corresponding to the position of the aperture pin 9. The operation described thus automatically adjusts the aperture to a setting value of the object distance.

When the normal photographic position of the optical system is shifted to a telephoto position, the embodiment operates as follows: The focal length change-over operation on the optical system shifts the change-over member 16 from its position of FIG. 2 to the right. The rightward move of the member 16 pushes the change-over lever 2 to turn it clockwise on the shaft 3 against the force of the spring 12 and keeps it in the position where it is abutting on the stopper 15 as shown in FIG. 3. With the normal focal length shifted to the telephoto focal length, let us assume that the aperture F-number of the lens increases by two steps and from F 2.8 to F 5.6 in this case. However, the F-number should remain unchanged for the same object distance. Therefore, in this particular instance, the shutter aperture must be made larger by two steps in response to the focal length change-over of the optical system. For that purpose, the aperture pin 9 must be shifted from the position of FIG. 2 further to the right by two steps. In this specific embodiment, this is carried out in the following manner: The change-over lever 2 turns on the shaft 4 clockwise from the position of FIG. 2 to the right after the focal length change-over of the optical system as mentioned above. Accordingly, the shaft 8 on which the distance lever 7 turns also moves rightward to a position as shown in FIG. 3. This rightward displacement of the shaft 8 allows the distance lever 7 to further turn clockwise for the same position of the distance ring 1. The lever 7 thus further turns clockwise until it comes to a new position with the distance transmission pin 11 again coming to abut on the distance cam 1a. Therefore, this enables the aperture pin 9 to further move rightward from the position of FIG. 2 until the further move is restricted by the end 7a of the distance lever 7. Under the tele-photo condition, the shutter aperture is thus allowed to become larger by two steps than in the case of the normal photographic condition. Further, either the stopper 15 or the shaft 4 may be arranged in an eccentric form to make its position adjustable. Such arrangement is advantageous as it permits elimination of any assembly error.

Figure 4:
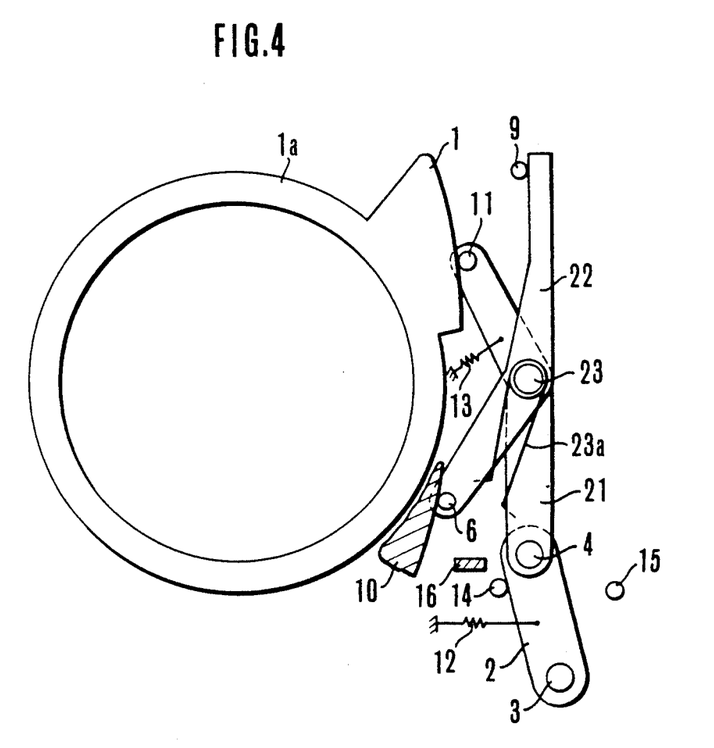
FIG. 4 is a partly simplified plane view of another embodiment of the invention.

FIG. 4 shows another embodiment. The same parts as those shown in FIGS. 2 and 3 are indicated by the same reference numerals. The following description covers only the points in which this embodiment differs from the preceding embodiment. A distance lever 21 is turnably connected to the change-over lever 2 by the shaft 4. The lever 21 has the distance transmission pin 11 secured to the fore end thereof and is urged by the spring 13 to have the pin 11 abutting on the distance cam 1a. An ISO sensitivity lever 22 is rotatably connected by a shaft 23 to the distance lever 21. The ISO sensitivity pin 6 is secured to one end of the ISO sensitivity lever 22 and is arranged to be shiftable along the ISO cam 10. Meanwhile, the other end of the ISO sensitivity lever 22 is arranged to restrict the rightward movement of the aperture pin 9. A spring 23a which hangs on a shaft 23 urges the ISO sensitivity lever 22 to turn clockwise relative to the distance lever 21. The change-over member 16 which operates in response to the focal length change-over of the optical system is arranged to cause the change-over lever 2 to turn on the shaft 3 to be in the position of abutting either on the stopper 14 or on the other stopper 15 in the same manner as in the preceding embodiment shown in FIGS. 2 and 3. This arrangement enables the shutter aperture in change according to the shift of focal length for the same object distance.

The two embodiments described in the foregoing are arranged to correct the aperture by shifting the position of the fulcrum shaft of either of the members 5 and 7 which are arranged to interlink the aperture adjusting member 9, the object distance adjusting member 1 and the ISO sensitivity adjusting member 10 to one another. However, in accordance with the invention, the aperture correction can be accomplished not only by the mechanism described but also by some other mechanism. For example, it is conceivable to have the ISO cam arranged to be displaced in association with a focal length change-over operation.

In accordance with the invention, as described in the foregoing, in carrying out a focal length change-over of the optical system of a variable focal length type camera having a common stop device, the aperture of the stop device can be corrected with an extremely simple mechanism to perform thereby an appropriate exposure according to object distance and film sensitivity. The invention is, therefore, very useful.

What I claim is:

1. An automatic diaphragm aperture determining mechanism for a camera including a photographic optical system variable in focal length and having an F number variable in accordance with changes in the focal length, comprising:
   (a) distance information transmitting means for transmitting information on an object distance;
   (b) film sensitivity information transmitting means for transmitting information on the sensitivity of a film;
   (c) focal length information transmitting means for transmitting information of changes in the F number of the photographic optical system accompanying the changes in the focal length of the photographic optical system by means of information of the focal length of the photographic optical system;
   (d) determining means for determining an aperture dimension of a diaphragm suited for flash photography in accordance with photographic information obtained from said distance information transmitting means, said film sensitivity information transmitting means and said focal length information transmitting means, said determining means determining in such a manner as to increase the diaphragm aperture dimension in cases where the F number of the photographic optical system changes to a large value accompanying the changes in the focal length, and determining in such a manner as to decrease the diaphragm aperture dimension in cases where the F number changes to a small value accompanying the changes in the focal length;
   (e) aperture adjusting means for adjusting the diaphragm aperture dimension of said photographic optical system, said aperture adjusting means being arranged to operate in accordance with an output of said determining means.

2. A mechanism according to claim 1, wherein said distance information transmitting means comprise focal point detecting means for detecting the focused position of said optical system.

3. A mechanism according to claim 1, wherein said film sensitivity information transmitting means comprise film sensitivity detecting means for detecting a film sensitivity adjusting position.

4. A mechanism according to claim 1, wherein said focal length information transmitting means comprise focal length detecting means for detecting the focal length shifted state of said optical system.

5. An automatic diaphragm aperture determining mechanism for a camera with a focal length varying device which is capable of effecting a change-over of focal length of a shiftable optical system at least between two different focal lengths, said change-over of the focal length causing changes in an F number, comprising:
   (a) a first member arranged to shift a position thereof by engaging a distance adjustment responsive member which moves in accordance with adjustment of an object distance;
   (b) a second member arranged to shift a position thereof by engaging a film sensitivity adjustment responsive member which moves in accordance with adjustment of a sensitivity of a film;
   (c) an aperture adjusting member for adjusting a diaphragm aperture dimension of said optical system;
   (d) a control member arranged to control an operation of said aperture adjusting member by moving in accordance with the shifted position of said first and second members; and
   (e) a third member arranged to shift a position of said control member in response to the focal length change-over action of said optical system, said third member detecting information of changes in the F number caused by the changes in the focal length from the focal length change-over action.

6. A mechanism according to claim 5, further comprising a first shaft which is displaceable and which is rotatably connected to said first and second members in a manner to permit them to pivot relative to each other.

7. A mechanism according to claim 6, further comprising a second shaft which is displaceable and which connects one of said first and second members with said third member in a manner to permit relative rotation therebetween.

8. An automatic diaphragm aperture determining mechanism for a camera including a photographic optical system variable in focal length and having an F number variable with changes in the focal length, comprising:
   (a) distance information transmitting means for transmitting information on an object distance;
   (b) focal length information transmitting means for transmitting information of changes in the F number of the photographic optical system accompanying the changes in the focal length of the photographic optical system by means of information of the focal length of the photographic optical system;
   (c) determining means for determining a diaphragm aperture dimension suited for flash photography on the basis of information obtained from at least said distance information transmitting means and said focal length information transmitting means, said determining means determining in such a manner as to increase the diaphragm aperture dimension in cases where the F number of the photographic optical system changes to a large value accompanying the changes in the focal length, and determining in such a manner as to decrease the diaphragm aperture dimension in cases where the F number changes to a small value accompanying the changes in the focal length;
   (d) aperture adjusting means for adjusting the diaphragm aperture dimension of said photographic optical system, said aperture adjusting means being arranged to operate in accordance with an output of said determining means.

9. An automatic diaphragm aperture determining mechanism for a camera including a photographic optical system variable in focal length and having an F number variable with changes in the focal length, comprising:
(a) a film sensitivity information transmitting means for transmitting information on sensitivity of a film;
(b) focal length information transmitting means for transmitting information of changes in the F number of the photographic optical system accompanying the changes in the focal length of the photographic optical system by means of information of the focal length of the photographic optical system;
(c) determining means for determining a diaphragm aperture dimension suited for flash photography on the basis of information obtained from at least said film sensitivity information transmitting means and said focal length information transmitting means, said determining means determining in such a manner as to increase the diaphragm aperture dimension in cases where the F number of the photographic optical system changes to a large value accompanying the changes in the focal length, and determining in such a manner as to decrease the diaphragm aperture dimension in cases where the F number changes to a small value accompanying the changes in the focal length; and
(d) aperture adjusting means for adjusting the diaphragm aperture dimension of said photographic optical system, said aperture adjusting means being arranged to operate in accordance with an output of said determining means.

10. An automatic diaphragm aperture determining device for a photographic optical system having a variable focal length with a common aperture and having a F number variable with changes in the focal length, comprising:
(a) distance information transmitting means for transmitting information on an object distance;
(b) sensitivity information transmitting means for transmitting information on sensitivity of a sensitive material;
(c) focal length information transmitting means for transmitting information of changes in the F number of said photographic optical system accompanying changes in the focal length of the photographic optical system by means of information of the focal length of the photographic optical system; and
(d) determining means for determining a diaphragm aperture dimension suited for flash photography in accordance with photographic information obtained from said distance information transmitting means, said sensitivity information transmitting means and said focal length information transmitting means, said determining means determining in such a manner as to increase the diaphragm aperture dimension in cases where the F number of the photographic optical system changes to a large value accompanying the changes in the focal length, and determining in such a manner as to decrease the diaphragm aperture dimension in cases where the F number changes to a small value accompanying the changes in the focal length.

11. A device according to claim 10, wherein said distance information transmitting means comprise focus condition detecting means for detecting the focused condition of said optical system.

12. A device according to claim 10, wherein said sensitivity information transmitting means comprises sensitivity detecting means for detecting a sensitive material sensitivity setting condition.

13. A device according to claim 10, wherein said focal length information transmitting means comprises focal length detecting means for detecting the focal length varying condition of said optical system.

14. An automatic diaphragm aperture determining device for a photographic optical system having a variable focal length with a common aperture and having an F number variable with changes in the focal length, comprising:
(a) distance information transmitting means for transmitting information on an object distance;
(b) focal length information transmitting means for transmitting information of changes in the F number of said photographic optical system accompanying the changes in the focal length of the photographic optical system by means of information of the focal length of the photographic optical system; and
(c) determining means for determining a diaphragm aperture dimension suited for flash photography on the basis of information obtained from at least said distance information transmitting means and said focal length information transmitting means, said determining means determining in such a manner as to increase the diaphragm aperture dimension in cases where the F number of the photographic optical system changes to a large value accompanying the changes in the focal length, and determining in such a manner as to decrease the diaphragm aperture dimension in cases where the F number changes to a small value accompanying the changes in the focal length.

15. A device according to claim 14, wherein said distance information transmitting means comprises focus condition detecting means for detecting the focused condition of said photographic optical system.

16. A device according to claim 14, wherein said focal length information transmitting means comprises focal length detecting means for detecting the focal length varying condition of said photographic optical system.

17. An automatic diaphragm aperture determining device for a photographic optical system having a variable focal length with a common aperture and having an F number variable with changes in the focal length, comprising:
(a) sensitivity information transmitting means for transmitting information on sensitivity of a sensitive material;
(b) focal length information transmitting means for transmitting information on the focal length of said photographic optical system; and
(c) determining means for determining a diaphragm aperture dimension suited for flash photography on the basis of information obtained from at least said sensitivity information transmitting means and said focal length information transmitting mans, said determining means determining in such a manner as to increase the diaphragm aperture dimension in cases where the F number of the photographic optical system changes to a large value accompanying the changes in the focal length, and determining in such a manner as to decrease the diaphragm aperture dimension in cases where the F number changes to a small value accompanying the changes in the focal length.

18. A device according to claim 17, wherein said sensitivity information transmitting means comprises sensitivity detecting means for detecting a sensitive material sensitivity setting condition.

19. A device according to claim 17, wherein said focal length information transmitting means comprises focal length detecting means for detecting the focal length varying condition of said optical system.

20. An automatic diaphragm aperture determining device for a photographic optical system having a variable focal length and having an F number variable with changes in the focal length, comprising:
 (a) distance information transmitting means for transmitting information on an object distance;
 (b) sensitivity information transmitting means for transmitting information on sensitivity of a sensitive material;
 (c) focal length information transmitting means for transmitting information of changes in the F number of said photographic optical system accompanying changes in the focal length of the photographic optical system by means of information of the focal length of the photographic optical system; and
 (d) determining means for determining a diaphragm aperture dimension suited for flash photography in accordance with photographic information obtained from said distance information transmitting means, said sensitivity information transmitting means and said focal length information transmitting means, said determining means determining in such as manner as to increase the diaphragm aperture dimension in cases where the F number of the photographic optical system changes to a large value accompanying the changes in the focal length, and determining in such a manner as to decrease the diaphragm aperture dimension in cases where the F number changes to a small value accompanying the changes in the focal length.

21. A device according to claim 20, wherein said distance information transmitting means comprise focus condition detecting means for detecting the focused condition of said optical system.

22. A device according to claim 20, wherein said sensitivity information transmitting means comprises sensitivity detecting means for detecting a sensitive material sensitivity setting condition.

23. A device according to claim 20, wherein said focal length information transmitting means comprises focal length detecting means for detecting the focal length varying condition of said optical system.

24. An automatic diaphragm aperture determining device for a photographic optical system having a variable focal length and having an F number variable with changes in the focal length, comprising:
 (a) distance information transmitting means for transmitting information on an object distance;
 (b) focal length information transmitting means for transmitting information of changes in the F number of said photographic optical system accompanying the changes in the focal length of the photographic optical system by means of information of the focal length of the photographic optical system; and
 (c) determining means for determining a diaphragm aperture dimension suited for flash photography on the basis of information obtained from at least said distance information transmitting means and said focal length information transmitting means, said determining means determining in such a manner as to increase the diaphragm aperture dimension in cases where the F number of the photographic optical system changes to a large value accompanying the changes in the focal length, and determining in such a manner as to decrease the diaphragm aperture dimension in cases where the F number changes to a small value accompanying the changes in the focal length.

25. A device according to claim 24, wherein said distance information transmitting means comprises focal condition detecting means for detecting the focused condition of said optical system.

26. A device according to claim 24, wherein said focal length information transmitting means comprise focal length detecting means for detecting the focal length varying condition of said optical system.

27. An automatic diaphragm aperture determining device for a photographic optical system having a variable focal length and having an F variable with changes in the focal length, comprising:
 (a) sensitivity information transmitting means for transmitting information on sensitivity of a sensitive material;
 (b) focal length information transmitting means for transmitting information on the focal length of said photographic optical system; and
 (c) determining means for determining a diaphragm aperture dimension suited for flash photography on the basis of information obtained from at least said sensitivity information transmitting means and said focal length information transmitting means, said determining means determining in such a manner as to increase the diaphragm aperture dimension in cases where the F number of the photographic optical system changes to a large value accompanying the changes in the focal length, and determining in such a manner as to decrease the diaphragm aperture dimension in cases where the F number changes to a small value accompanying the changes in the focal length.

28. A device according to claim 27, wherein said sensitivity information transmitting means comprises sensitive material sensitivity detecting means for detecting sensitivity setting condition.

29. A device according to claim 27, wherein said focal length information transmitting means comprises focal length detecting means for detecting the focal length varying condition of said optical system.

30. A flash photography device for a camera with a photographic optical system having a variable focal length and having an F number variable with changes in the focal length, comprising;
 (a) means for transmitting distance information corresponding to a camera-to-subject distance;
 (b) means for transmitting focal length information corresponding to the focal length of said photographic optical system for the camera, said transmitting means transmitting information on changes in the F number caused by the changes in the focal length of said photographic optical system by means of information of the focal length of said photographic optical system; and
(c) means for obtaining an aperture size suited for flash photography on the basis of the distance information and the focal length information.

31. A camera having an automatic diaphragm aperture determining device for a photographic optical system having a variable focal length with a common aperture and having a F number variable with changes in the focal length, comprising:
(a) distance information transmitting means for transmitting information on an object distance;
(b) sensitivity information transmitting means for transmitting information on sensitivity of a sensitive material;
(c) focal length information transmitting means for transmitting information of changes in the F number of said photographic optical system accompanying changes in the focal length of the photographic optical system by means of information of the focal length of the photographic optical system; and
(d) determining means for determining a diaphragm aperture dimension suited for flash photography in accordance with photographic information obtained from said distance information transmitting means, said sensitivity information transmitting means and said focal length information transmitting means, said determining means determining in such a manner as to increase the diaphragm aperture dimension in cases where the F number of the photographic optical system changes to a large value accompanying the changes in the focal length, and determining in such a manner as to decrease the diaphragm aperture dimension in cases where the F number changes to a small value accompanying the changes in the focal length.

32. A camera having a automatic diaphragm aperture determining device for a photographic optical system having a variable focal length with a common aperture and having an F number variable with changes in the focal length, comprising:
(a) distance information transmitting means for transmitting information on an object distance;
(b) focal length information transmitting means for transmitting information of changes in the F number of said photographic optical system accompanying the changes in the focal length of the photographic optical system by means of information of the focal length of the photographic optical system; and
(c) determining means for determining a diaphragm aperture dimension suited for flash photography on the basis of information obtained from at least said distance information transmitting means and said focal length information transmitting means, said determining means determining in such a manner as to increase the diaphragm aperture dimension in cases where the F number of the photographic optical system changes to a large value accompanying the changes in the focal length, and determining in such a manner as to decrease the diaphragm aperture dimension in cases where the F number changes to a small value accompanying the changes in the focal length.

33. A camera having an automatic diaphragm aperture determining device for a photographic optical system having a variable focal length with a common aperture and having an F number variable with changes in the focal length, comprising:
(a) sensitivity information transmitting means for transmitting information on sensitivity of a sensitive material;
(b) focal length information transmitting means for transmitting information on the focal length of said photographic optical system; and
(c) determining means for determining a diaphragm aperture dimension suited for flash photography on the basis of information obtained from at least said sensitivity information transmitting means and said focal length information transmitting means, said determining means determining in such a manner as to increase the diaphragm aperture dimension in cases where the F number of the photographic optical system changes to a large value accompanying the changes in the focal length, and determining in such a manner as to decrease the diaphragm aperture dimension in cases where the F number changes to a small value accompanying the changes in the focal length.

34. A camera having an automatic diaphragm aperture determining device for a photographic optical system having a variable focal length and having an F number variable with changes in the focal length, comprising:
(a) distance information transmitting means for transmitting information on an object distance;
(b) sensitivity information transmitting means for transmitting information on sensitivity of a sensitive material;
(c) focal length information transmitting means for transmitting information of changes in the F number of said photographic optical system accompanying changes in the focal length of the photographic optical system by means of information of the focal length of the photographic optical system; and
(d) determining means for determining a diaphragm aperture dimension suited for flash photography in accordance with photographic information obtained from said distance information transmitting means, said sensitivity information transmitting means and said focal length information transmitting means, said determining means determining in such a manner as to increase the diaphragm aperture dimension in cases where the F number of the photographic optical system changes to a large value accompanying the changes in the focal length, and determining in such a manner as to decrease the diaphragm aperture dimension in cases where the F number changes to a small value accompanying the changes in the focal length.

35. A camera having an automatic diaphragm aperture determining device for a photographic optical system having a variable focal length and having an F number variable with changes in the focal length, comprising:
(a) distance information transmitting means for transmitting information on an object distance;
(b) focal length information transmitting means for transmitting information of changes in the F number of said photographic optical system accompanying changes in the focal length of the photographic optical system by means of information of the focal length of the photographic optical system; and (c) determining means for determining a diaphragm aperture dimension suited for flash photography on the basis of information obtained from at least said distance information transmitting means and said focal length information transmitting means, said determining means determining in such a manner as to increase the diaphragm aperture dimension in cases where the F number of the photographic optical system changes to a large value accompanying the changes in the focal length, and determining in such a manner as to decrease the diaphragm aperture dimension in cases where the F number changes to a small value accompanying the changes in the focal length.

36. A camera having an automatic diaphragm aperture determining device for a photographic optical system having a variable focal length and having an F number variable with changes in the focal length, comprising:
(a) sensitivity information transmitting means for transmitting information on sensitivity of a sensitive material;
(b) focal length information transmitting means for transmitting information on the focal length of said photographic optical system; and
(c) determining means for determining a diaphragm aperture dimension suited for flash photography on the basis of information obtained from at least said sensitivity information transmitting means and said focal length information transmitting means, said determining means determining in such a manner as to increase the diaphragm aperture dimension in cases where the F number of the photographic optical system changes to a large value accompanying the changes in the focal length, and determining in such a manner as to decrease the diaphragm aperture dimension in cases where the F number changes to a small value accompanying the changes in the focal length.

37. A camera with a photographic optical system having a variable focal length and having an F number variable with changes in the focal length, comprising:
(a) means for transmitting distance information corresponding to a camera-to-subject distance;
(b) means for transmitting focal length information corresponding to the focal length of said photographic optical system for the camera, said transmitting means transmitting information on changes in the F number caused by the changes in the focal length of said photographic optical system by means of information on the focal length of said photographic optical system; and
(c) means for obtaining an aperture size suited for flash photography on the basis of the distance information and the focal length information.

38. A flash photography device for a camera with a photographic optical system having a variable focal length and having an F number variable with changes in the focal length, comprising:
(a) means for transmitting sensitive information corresponding to sensitivity of a sensitive material;
(b) means for transmitting focal length information corresponding to the focal length of said photographic optical system for the camera, said transmitting means transmitting information on changes in the F number caused by the changes in the focal length of said photographic optical system by means of information on the focal length of said photographic optical system; and
(c) means for obtaining an aperture size suited for flash photography on the basis of the sensitive information and the focal length information.

39. A camera with a photographic optical system having a variable focal length and having an F number variable with changes in the focal length, comprising:
(a) means for transmitting sensitive information corresponding to sensitivity of a sensitive material;
(b) means for transmitting focal length information corresponding to the focal length of said photographic optical system for the camera, said transmitting means transmitting information on changes in the F number caused by the changes in the focal length of said photographic optical system by means of information on the focal length of said photographic optical system; and
(c) means for obtaining an aperture size suited for flash photography on the basis of the sensitive information and the focal length information.

40. A flash photography device for a camera with a photographic optical system having a variable focal length and having an F number variable with changes in the focal length, comprising:
(a) means for transmitting sensitive information corresponding to sensitivity of a sensitive material;
(b) means for transmitting distance information corresponding to a camera-two-subject distance;
(c) means for transmitting focal length information corresponding to the focal length of said photographic optical system for the camera, said transmitting means transmitting information on changes in the F number caused by the changes in the focal length of said photographic optical system by means of information on the focal length of said photographic optical system; and p1 (d) means for obtaining an aperture size suited for flash photography on the basis of the sensitive information and the distance information and the focal information.

41. A camera with a photographic optical system having a variable focal length and having an F number variable with changes in the focal length, comprising:
(a) means for transmitting sensitive information corresponding to sensitivity of a sensitive material;
(b) means for transmitting distance information corresponding to a camera-to-subject distance;
(c) means for transmitting focal length information corresponding to the focal length of said photographic optical system for the camera, said transmitting means transmitting information on changes in the F number caused by the changes in the focal length of said photographic optical system by means of information on the focal length of said photographic optical system; and
(d) means for obtaining an aperture size suited for flash photography on the basis of the sensitive information and the distance information and the focal length information.

* * * * *